United States Patent
Cobb et al.

(10) Patent No.: US 7,165,842 B2
(45) Date of Patent: Jan. 23, 2007

(54) AUTOSTEREOSCOPIC DISPLAY APPARATUS HAVING GLARE SUPPRESSION

(75) Inventors: Joshua M. Cobb, Victor, NY (US); Mark E. Bridges, Spencerport, NY (US); Allan M. Waugh, Rochester, NY (US); James E. Roddy, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 248 days.

(21) Appl. No.: 10/939,661

(22) Filed: Sep. 13, 2004

(65) Prior Publication Data

US 2006/0055886 A1 Mar. 16, 2006

(51) Int. Cl.
  *G03B 21/14* (2006.01)
  *G03B 27/14* (2006.01)
  *G02B 27/22* (2006.01)
  *G02B 27/24* (2006.01)
  *H04N 13/04* (2006.01)

(52) U.S. Cl. .................. 353/7; 353/8; 353/10; 353/20; 359/462; 359/471; 359/479; 359/630; 348/42; 348/52

(58) Field of Classification Search .................. 353/7, 353/8, 10, 20; 359/630, 471, 479, 426, 462; 348/42–60
See application file for complete search history.

(56) References Cited

U.S. PATENT DOCUMENTS

| 5,625,372 A | 4/1997 | Hildebrand et al. ............ 345/8 |
| 5,908,300 A | 6/1999 | Walker et al. ................. 434/43 |
| 5,976,017 A | 11/1999 | Omori et al. ................. 463/32 |
| 6,318,868 B1 | 11/2001 | Larussa ....................... 359/857 |
| 6,416,181 B1 | 7/2002 | Kessler et al. .................. 353/7 |
| 6,522,474 B1 * | 2/2003 | Cobb et al. .................. 359/633 |
| 6,636,234 B1 | 10/2003 | Endo et al. .................... 345/646 |
| 6,674,881 B1 | 1/2004 | Bacus et al. ................. 382/128 |
| 6,752,498 B1 * | 6/2004 | Covannon et al. .......... 351/240 |
| 2002/0126396 A1 * | 9/2002 | Dolgoff ....................... 359/743 |

* cited by examiner

*Primary Examiner*—Melissa Jan Koval
(74) *Attorney, Agent, or Firm*—Nelson Adrian Blish

(57) ABSTRACT

An improved autostereoscopic display apparatus (10) forms left and right virtual images for pupil imaging by forming, through a beamsplitter (16), a real intermediate image near the focal surface of a curved mirror (24). A circular polarizer (90) is disposed at a position between viewing pupils (14*l*, 14*r*) and the beamsplitter (16), minimizing glare due to stray light reflection from the curved mirror surface.

25 Claims, 12 Drawing Sheets

AUTOSTEREOSCOPIC DISPLAY APPARATUS HAVING GLARE SUPPRESSION

CROSS REFERENCE TO RELATED APPLICATIONS

Reference is made to commonly-assigned copending U.S. patent application Ser. No. 10/393,236, filed Mar. 20, 2003, entitled METHOD AND APPARATUS FOR MONOCENTRIC PROJECTION OF AN IMAGE, by Joshua M. Cobb; U.S. patent application Ser. No. 10/662,208, filed Sep. 12, 2003, entitled AUTOSTEREOSCOPIC OPTICAL APPARATUS by Joshua M. Cobb; and U.S. patent application Ser. No. 10/854,116, filed May 25, 2004, entitled AUTOSTEREOSCOPIC DISPLAY APPARATUS by Joshua M. Cobb; the disclosures of which are incorporated herein.

FIELD OF THE INVENTION

This invention generally relates to display apparatus and more particularly to an image generation apparatus for an autostereoscopic display providing a wide field of view, large left and right viewing pupils, and high brightness, with improved cost and reduced size and equipped with glare suppression and contrast enhancement.

BACKGROUND OF THE INVENTION

The potential value of autostereoscopic display systems is well appreciated for a broad range of data visualization uses and for a wide range of applications that include entertainment, engineering, medical, government, security, and simulation fields. Autostereoscopic display systems include "immersion" systems, intended to provide a realistic viewing experience for an observer by visually surrounding the observer with a three-dimensional (3-D) image having a very wide field of view. As differentiated from the larger group of stereoscopic displays that include it, the autostereoscopic display is characterized by the absence of any requirement for a wearable item of any type, such as goggles, headgear, or special polarized or filter glasses, for example. That is, an autostereoscopic display attempts to provide "natural" viewing conditions for an observer.

A number of conventional stereoscopic imaging systems display a real image as contrasted with a virtual image. It is important to clarify the distinction between real and virtual imaging. A real image is defined as an image that is either focused on a surface or focused in an accessible location. That is, a screen can be placed at the position of a real image in order to display the image.

Unlike real imaging projection, a virtual imaging system forms an image that is not focused at an accessible location. That is, a virtual image is not formed by projection onto a display surface; if a display surface were positioned at the perceived location of a virtual image, no image would be formed on that surface. Instead, a virtual image is formed by an optical system. A virtual image can be considered to be formed by the eye itself, forming an image according to light incident on the retina. A virtual image occurs, for example, when an object is between the focal point and the vertex of a concave mirrored surface.

Virtual imaging provides an advantageous alternative to real image projection in some types of applications. U.S. Pat. No. 5,625,372 (Hildebrand et al.) outlines a number of inherent advantages of virtual imaging over the alternative real imaging that is commonly used for image projection. As one significant advantage for stereoscopic viewing, the size of a virtual image is not limited by the size or location of a display surface. Additionally, the source object for a virtual image may be small. A magnifying glass, as a simple example, provides an enlarged virtual image of a small object. Print viewed through a magnifying glass not only appears larger, it also appears to be located substantially behind the surface of the page where the print actually exists. By definition, then, a virtual image can exist at a location where no display surface exists. Thus, it can be seen that, in comparison with prior art systems that project a real image, a more realistic viewing experience can be provided by forming a virtual image that is formed so as to appear some distance away. Providing a virtual image also obviates the need to compensate for screen artifacts, as may be necessary when projecting a real image.

It is instructive to point out that the term "virtual image" is itself often casually misused in patent and related literature about immersive imaging systems and other apparatus that are often described as "virtual reality" systems. As one example, U.S. Pat. No. 5,976,017 (Omori et al.) makes a number of references to "virtual image" using the casual interpretation of this term as simply some type of electronically generated image, rather than using the definition understood by the optics practitioner. (Other examples of this unfortunate, casual use of the term "virtual image" can be easily found in the patent literature; as just a few additional examples, see U.S. Pat. No. 6,636,234 (Endo et al.) and U.S. Pat. No. 6,674,881 (Bacus et al.), both of which use the term "virtual image" in its casual sense, rather than holding to the definition used in optics.) In the disclosure of the present application, the term "virtual image" is used in its true optical sense.

It is generally recognized that, in order to minimize vergence/accommodation effects, a 3-D viewing system should display its pair of stereoscopic images, whether real or virtual, at a relatively large distance from the observer. For real image projection, this means that a large display surface must be employed, preferably placed a good distance from the observer. For virtual images, however, a relatively small curved mirror can be used as is disclosed in U.S. Pat. No. 5,908,300 (Walker et al.) The curved mirror in a virtual imaging system of this type acts as a collimator, forming a virtual image that appears to be at a relatively large distance from the observer. In terms of focus, the image formed in such a virtual imaging system appears to be at infinity.

From an optical perspective, it can be seen that there would be advantages to autostereoscopic design using pupil imaging. A system designed for pupil imaging must meet a fairly demanding set of requirements, including the following:

(a) form separate images at left and right pupils correspondingly;
(b) provide the most natural viewing conditions possible, eliminating any need for goggles or special headgear;
(c) present the largest possible pupils to the observer, while limiting crosstalk between left and right views;
(d) allow the observer a reasonable freedom of movement;
(e) provide an ultra-wide field of view; and
(f) provide sufficient resolution for realistic imaging, with high brightness and contrast.

It is recognized in the optical arts that each of these requirements, by itself, can be difficult to achieve. An ideal autostereoscopic imaging system must meet the challenge of each of these requirements to provide a more fully satisfactory and realistic viewing experience. Moreover, additional physical constraints presented by the need for a system to have small footprint, and dimensional constraints for interocular separation must be considered, so that separate images directed to each eye can be advantageously spaced and correctly separated for viewing. It is instructive to note that interocular distance constraints limit the ability to achieve larger pupil diameter at a given ultrawide field by simply scaling the projection lens.

It is instructive to observe that systems using curved mirrors to generate virtual images have been disclosed, such as in U.S. Pat. No. 6,318,868 (Larussa), for example. However, the added complexity of providing pupil imaging in a virtual imaging system, where the pupil imaging meets the performance requirements (a)–(e) given above, presents a significant challenge for optical design. Clearly, the value and realistic quality of the viewing experience provided by an autostereoscopic display system using pupil imaging is enhanced by presenting the stereo 3-D image with a wide field of view and large exit pupil. For fully satisfactory 3-D viewing, such a system should provide separate, high-resolution images to right and left eyes. To create a realistic illusion of depth and width of field, the observer should be presented with a virtual image that requires the viewer to focus at some distance.

There are a number of basic optical limitations for immersion systems that must be addressed with any type of optical projection that provides a wide field of view. An important limitation is imposed by the Lagrange invariant. A product of the size of the emissive device and the numerical aperture, the Lagrange invariant determines output brightness and is an important consideration for matching the output of one optical system with the input of another. Any imaging system conforms to the Lagrange invariant, whereby the product of pupil size and semi-field angle is proportional to the product of the image size and the numerical aperture. An invariant that applies throughout the optical system, the Lagrange invariant can be a limitation when using, as an image generator, a relatively small spatial light modulator or similar pixel array which operate over a relatively small numerical aperture, since the Lagrange value associated with the device is small. In practical terms, the larger the size of the image source, the easier it is to form an image having a wide field of view and large pupil.

In response to the need for more realistic autostereoscopic display solutions offering a wide field of view, commonly-assigned U.S. Pat. No. 6,416,181 (Kessler et al.), incorporated herein by reference and referred to as the '181 patent, discloses an autostereoscopic imaging system using pupil imaging to display collimated left and right virtual images to a viewer. In the '181 disclosure, a curved mirror is employed in combination with an imaging source, a curved diffusive surface, a ball lens assembly, and a beamsplitter, for providing the virtual image for left and right viewing pupils. Overall, the monocentric optical apparatus of the '181 disclosure provides autostereoscopic imaging with large viewing pupils, a very wide field of view, and minimal aberration.

While the autostereoscopic system of the '181 disclosure provides a high-performance immersive display, there is still room for improved embodiments. For example, while the '181 system provides a large viewing pupil, there would be advantages in obtaining even further increases in pupil size.

Generating its source image on a small spatial light modulator device, the '181 system overcomes inherent Lagrange invariant conditions by forming an intermediate curved image for projection on a curved diffusive surface. Use of the diffuser with the '181 apparatus is necessary because the image-forming device, typically a reflective liquid crystal on silicon (LCOS) or other spatial light modulator, is a relatively small image source device, measuring typically no more than about 1 inch square. At the same time, however, the use of a diffusive surface effectively reduces overall brightness, introduces some level of graininess to the image, and limits the achievable contrast.

Subsequent commonly-assigned applications have addressed the need for more compact autostereoscopic apparatus providing pupil imaging with virtual images and for achieving improved brightness levels. For example, U.S. patent application Ser. No. 10/662,208 (Cobb), cited above, discloses improved apparatus and methods for forming curved left and right intermediate images, using an approach that eliminates the need for use of a diffusive surface and allows the use of larger image sources that are able to provide additional brightness. U.S. patent application Ser. No. 10/854,116 (Cobb), also cited above, describes a highly compact embodiment that provides improved brightness (herein called the Cobb device). While this system provides improved imaging and offers the potential of lower cost, there is still room for improvement.

A two-mirror system, such as that employed in the Cobb device, provides left and right pupil imaging, but can also provide "phantom" or "outrigger" pupils in addition to the left and right viewing pupils. From the viewer's perspective, these outrigger pupils can be visible from some angles, but do not detract from the overall autostereoscopic image. However, stray light entering this system through either of these outrigger pupils can produce a background image or background glare, in which light from objects that are behind the viewer is inadvertently reflected from the curved mirror and is misdirected to a viewing pupil.

Thus, it can be seen that there is a need for an improved dual-mirror autostereoscopic imaging apparatus that is substantially free of glare and other imaging anomalies that can result from stray light introduced through an unused viewing pupil.

SUMMARY OF THE INVENTION

It is an object of the present invention to provide an autostereoscopic display device having improved viewing pupil size, brightness, and resolution, with reduced image glare. With this object in mind, the present invention provides, in an autostereoscopic display apparatus that forms each left and right virtual image for pupil imaging by forming, through a beamsplitter, a real intermediate image near the focal surface of a curved mirror, the improvement for minimizing background images due to stray light reflection from the curved mirror surface comprising a circular polarizer disposed at a position between viewing pupils and the beamsplitter.

From another aspect, the present invention provides method for forming an autostereoscopic image comprising a left image to be viewed by an observer at a left viewing pupil and a right image to be viewed by the observer at a right viewing pupil, the method comprising:
  (a) forming a left curved intermediate image near the focal surface of a curved mirror by:
    (i) forming a left source image from a left image source;
    (ii) collecting light from the left image source and folding the light path at a reflective surface to form the left curved intermediate image, whereby the exit pupil is optically centered near the center of curvature of the left curved intermediate image;

(b) forming a right curved intermediate image near the focal surface of the curved mirror by:
  (i) forming a right source image from a right image source;
  (ii) collecting light from the right image source and folding the light path at a reflective surface to form the right curved intermediate image, whereby the exit pupil is optically centered near the center of curvature of the right curved intermediate image;
wherein the center of curvature of the curved mirror is substantially optically midway between the exit pupil of the left and right optical paths;
(c) disposing a beamsplitter between the focal surface and the center of curvature of the curved mirror, the curved mirror and beamsplitter cooperating to form, at the left viewing pupil:
  (i) a real image of the pupil of the left prism; and
  (ii) an image of the left curved intermediate image that appears to be behind the curved mirror;
the curved mirror and beamsplitter further cooperating to form, at the right viewing pupil:
  (i) a real image of the pupil of the right prism; and
  (ii) an image of the right curved intermediate image that appears to be behind the curved mirror; and
(d) disposing a circular polarizer between the beamsplitter and the left and right viewing pupils for conditioning the polarization of incident and output light.

It is a feature of the present invention that it uses polarization to minimize the effects of stray light on a pupil imaging system having outrigger pupils in addition to right and left viewing pupils. This allows the autostereoscopic display device to provide large viewing pupils having good brightness levels without the ill effects of background imaging from stray reflection through outrigger pupils.

It is an advantage of the present invention that it provides an autostereoscopic imaging display apparatus that forms an intermediate image without perceptible glare from stray background light.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

For the purposes of the present application, a curved image is an image for which best focus lies in a shape that is substantially spherical. The optical path is simplest when curved images are themselves spherically curved. By forming and using curved intermediate images, for example, rather than flat, planar images, the optics of the present invention take advantage of various symmetrical arrangements and relationships that are favorable for pupil imaging using virtual images, as is described in this section.

Similarly, for reasons that become apparent upon reading this detailed description, a curved mirror, as described in this application, is preferably spherical, having a single center of curvature.

Figure 1:
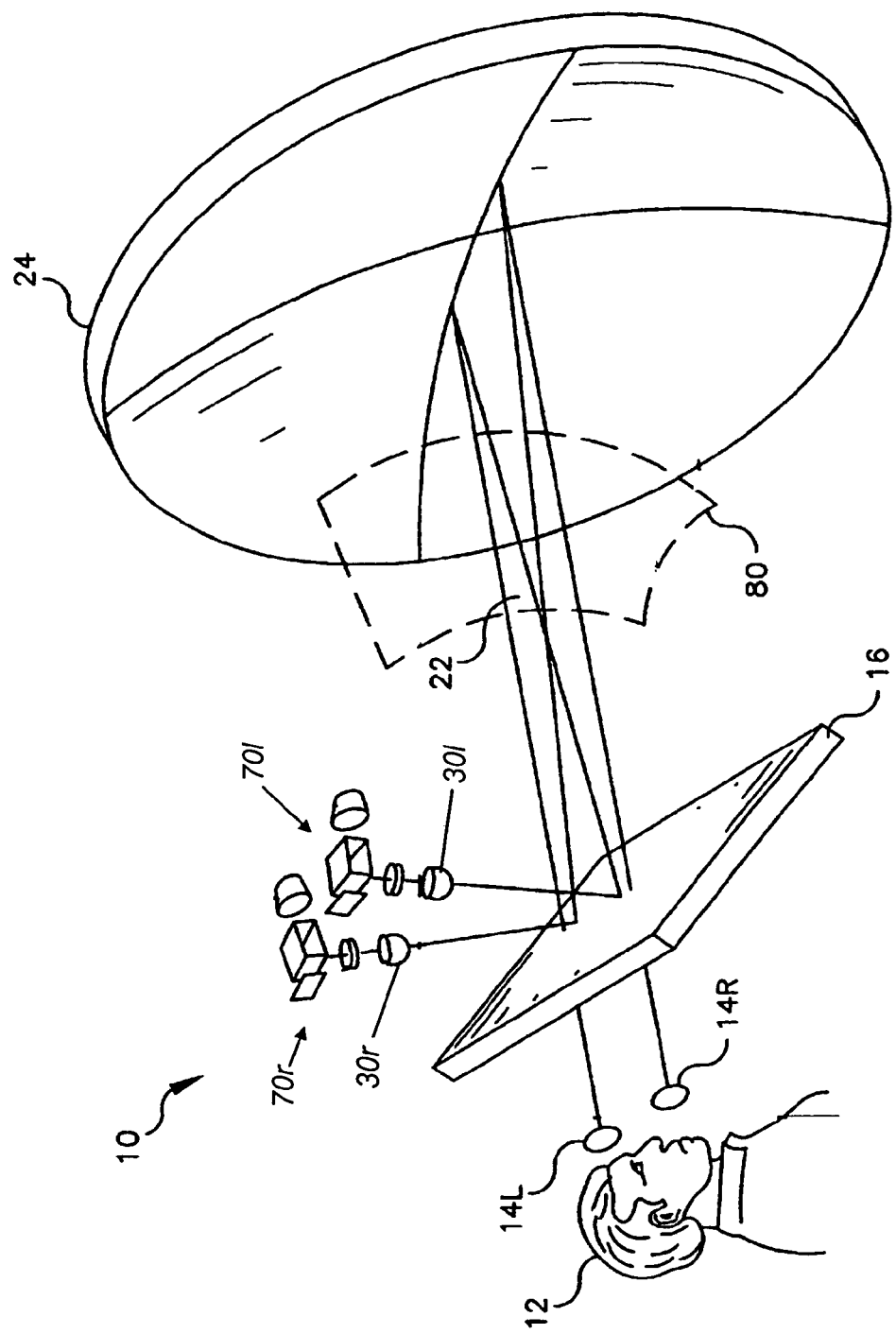
FIG. 1 shows a prior art autostereoscopic display system using pupil imaging to provide a virtual image.

In the prior art autostereoscopic projection apparatus 10 described in U.S. Pat. No. 6,416,181 and as shown in FIG. 1, a single curved mirror 24 is employed, in combination with a beamsplitter 16 to provide an autostereoscopic virtual image to a viewer 12 at left and right viewing pupils 14*l* and 14*r*. For each viewing pupil 14*l* and 14*r*, the virtual image that is formed appears as if positioned behind curved mirror 24. For both left and right viewing pupils 14*l* and 14*r*, a corresponding image generation system 70*l* and 70*r* provides an initial intermediate curved image that is then projected through a corresponding left or right ball lens assembly 30*l*, 30*r* in order to form an intermediate curved image 80 near a focal surface of curved mirror 24. As FIG. 1 shows, the left and right optical paths cross between beamsplitter 16 and curved mirror 24, due to the nature of imaging using curved mirror 24. Beamsplitter 16 is disposed between the focal surface and the center of curvature of curved mirror 24. It is important to note that because left and right intermediate curved images 80 have centers of curvature that are not quite coincident, the actual curved images 80 cannot lie perfectly on each other, nor lie perfectly on the focal surface of curved mirror 24.

Figure 2:
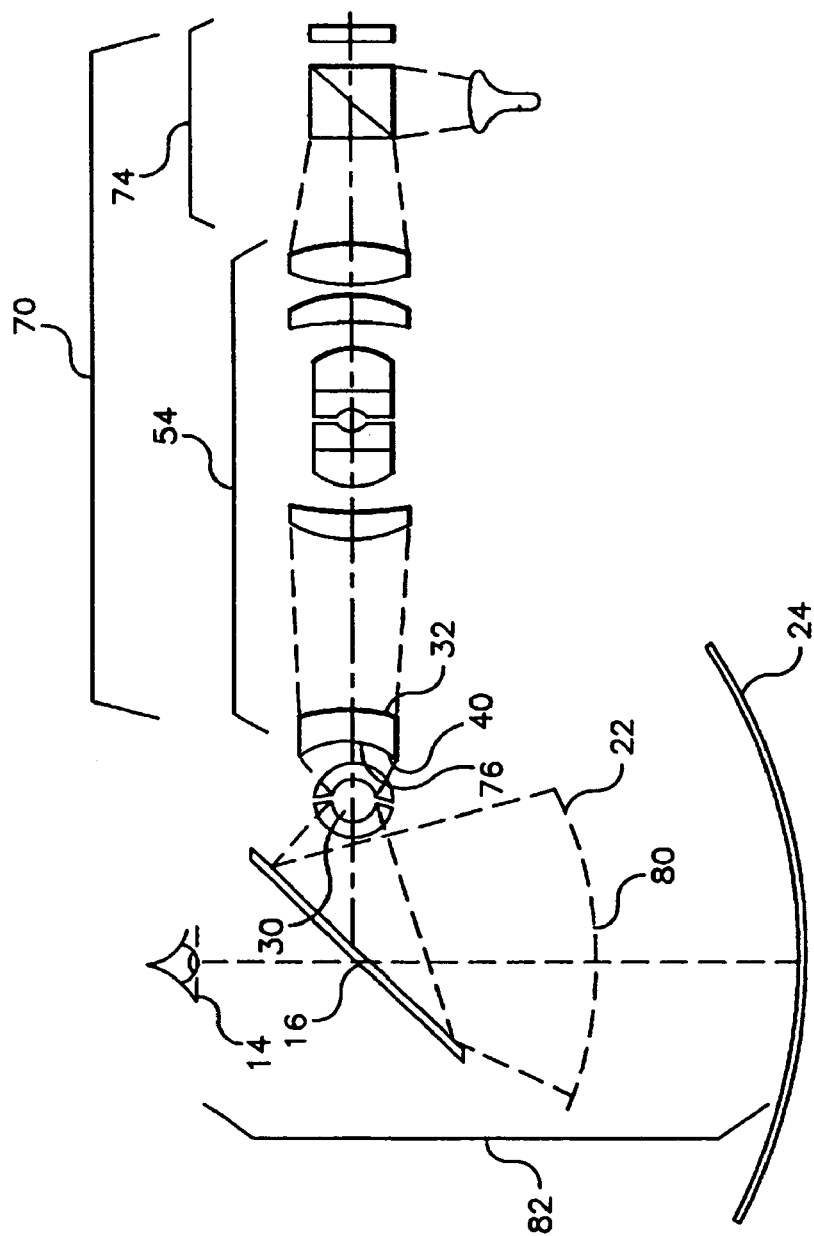
FIG. 2 shows a detailed view of image generation system components for the prior art system of FIG. 1.

Referring to FIG. 2, there is shown, extracted from the more detailed prior art description of the '181 disclosure noted in the background section above, a portion of an image generation system 70 that cooperates with ball lens assembly 30 for providing intermediate curved image 80 for projection in a stereoscopic projection system 82 for one viewing pupil 14. Here, an image generator 74 provides a source image from a flat surface, such as from a reflective LCOS spatial light modulator. A relay lens 54 directs light from image generator 74 onto a diffusing element 32, so that a curved intermediate image 76 is formed on a diffusive surface 40. Ball lens assembly 30, cooperating with beamsplitter 16, then projects curved intermediate image 76 toward a front focal surface 22 of curved mirror 24 to form intermediate curved image 80. Curved mirror 24 then provides a virtual image of intermediate curved image 80 for a viewing pupil 14.

Forming a Curved Intermediate Image

While image generation system 70, ball lens assembly 30 and beamsplitter 16 as shown in FIGS. 1 and 2 provide intermediate image 80 having suitable curvature and at the optimal exit pupil location for forming a virtual image that appears to be behind curved mirror 24, there are other methods for forming curved intermediate image 80. The crux of the present invention is an alternate apparatus and method for forming curved intermediate image 80 without the need for any additional beamsplitters, which can introduce minor imaging aberrations and reduce brightness, and without the requirement for ball lens optics, such as are used with the prior art arrangement of FIGS. 1 and 2. Moreover, the apparatus of the present invention allows the deployment of more conventional projection optics with an autostereoscopic virtual imaging system.

Figure 3:
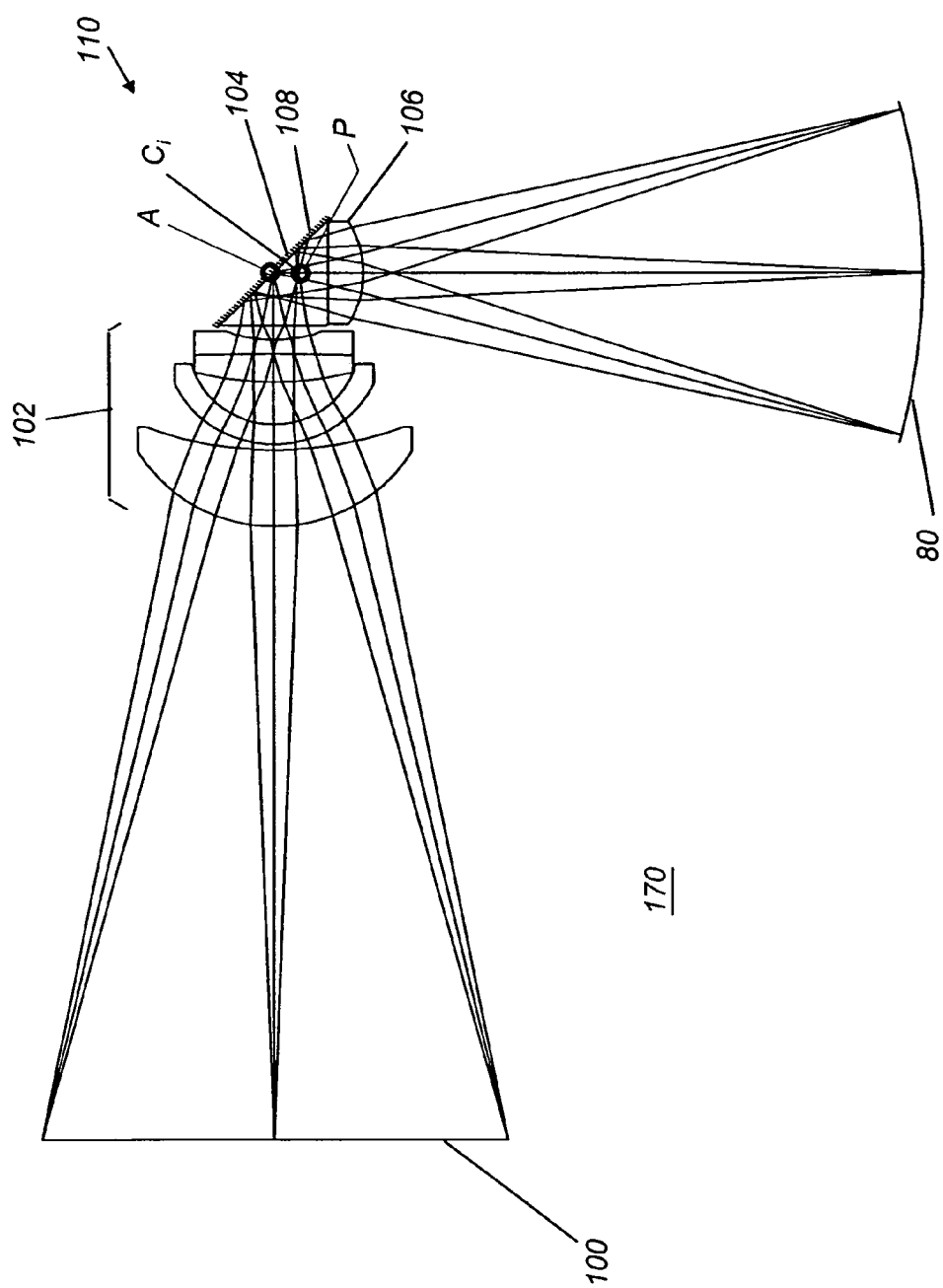
FIG. 3 is a side view showing the basic components and optical behavior of an image generation system according to the present invention.
Figure 8:
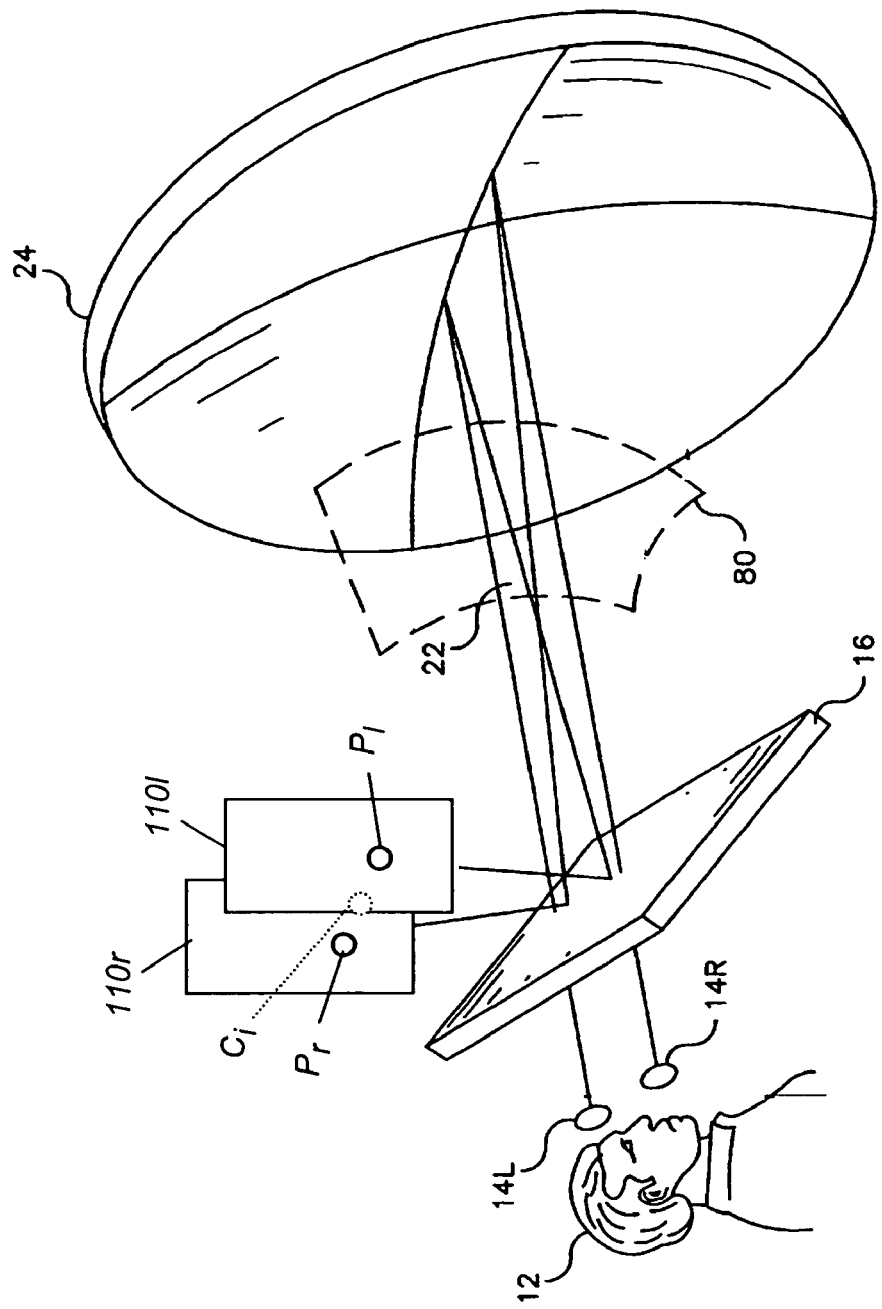
FIG. 8 is a perspective view showing the basic components and optical behavior of an image generation system in a single-mirror embodiment according to the present invention.

Referring to FIG. 3, there is shown, in cross-sectional side view, an image generation system 170 in one embodiment of the present invention. With reference to autostereoscopic projection apparatus 10 shown in FIG. 1, one image generation system 170 of FIG. 3 could be substituted for each of left and right image generation systems 70*l* and 70*r* with their corresponding left and right ball lens assemblies 30*l* and 30*r*. This alternate arrangement is shown in FIG. 8. That is, image generation system 170 cooperates with beamsplitter 16 to form intermediate curved image 80.

In image generation system 170 of FIG. 3, an image source 100 provides modulated light to an optical assembly 110. Optical assembly 110 has entrance optics 102, typically a compound lens as shown in FIG. 3, optically coupled with a turning prism 104 having a reflective surface 108 that redirects light from entrance optics 102 to form intermediate image 80. Turning prism 104 has an output lens 106, typically a plano-convex lens as shown. Here, reflective surface 108 is a coated surface of turning prism 104 for reflecting light incident from entrance optics 102. It is important to observe that the mirrored surface of the prism is at the aperture stop A of image generation system 170. In this embodiment, the location of the exit pupil P of image generation system 170 depends on the focal length of output lens 106 and on the thickness and material of prism 104. Exit pupil P can be coincident with aperture stop A, at reflective surface 108. (Coincidence of exit pupil P and aperture stop A holds true, for example, with ball lens assembly 30 in the prior art embodiment of FIG. 1.) With the arrangements of FIGS. 4–8, for example, pupil P is located within about 12 mm of aperture stop A.

Ideally, the center of curvature $C_i$ of intermediate curved image 80 lies on pupil P as is shown in FIG. 3. With this arrangement, the optics of image generation system 170 can be made highly compact, since aperture stop A has a relatively small area. As is described subsequently, folding the imaging path at aperture stop A provides a compact configuration that is particularly advantaged for pupil imaging.

The use of turning prism 104 also provides optical assembly 110 with the advantage of a shortened optical path length around the aperture stop location, particularly where a high index glass or other high index material is used. The materials used for turning prism 104, entrance optics 102, and output lens 106 need not be the same and need not be in physical contact with one another.

System Embodiment

Figure 4:
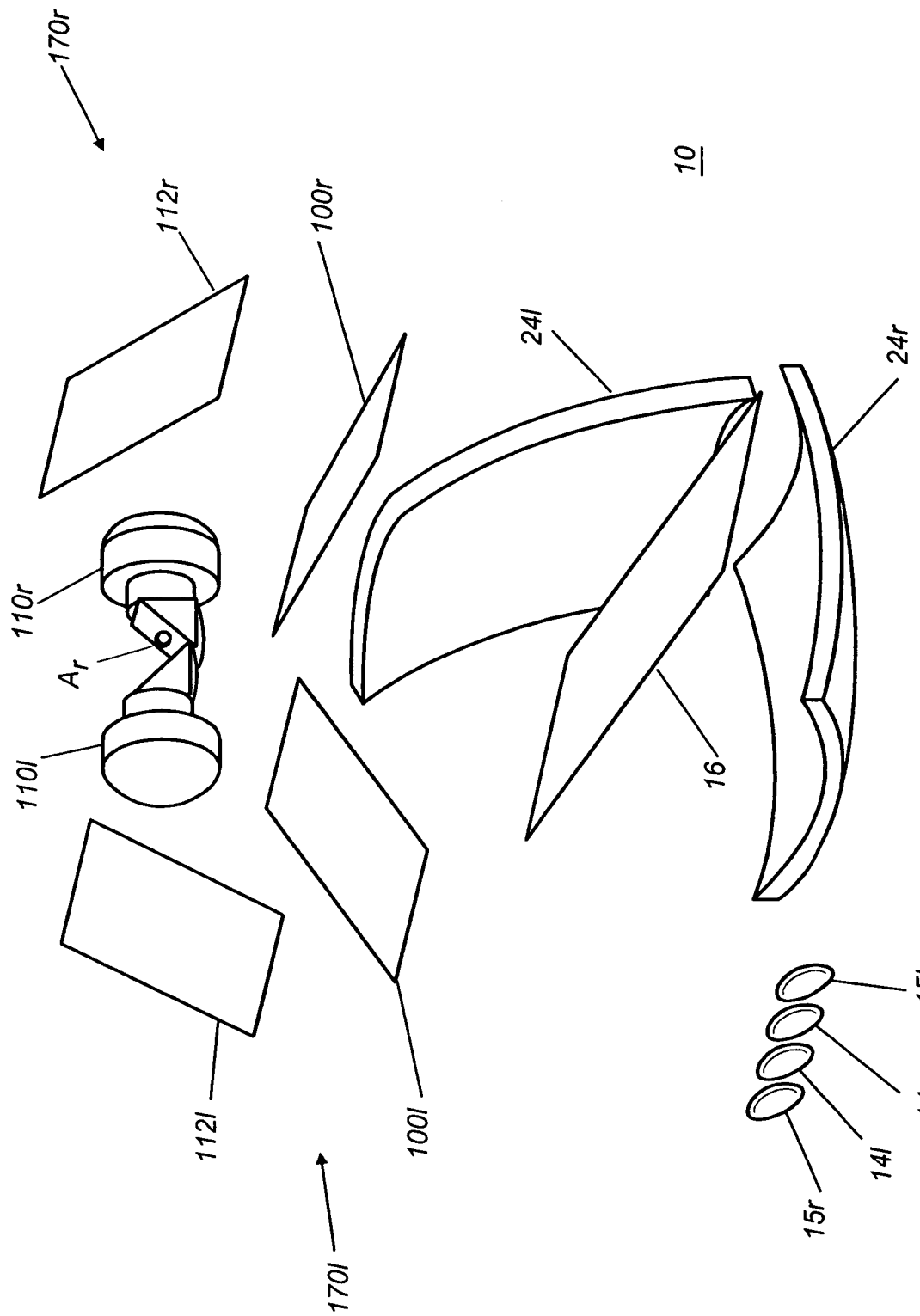
FIG. 4 is a perspective view of the basic components of an autostereoscopic imaging system using the image generation system of the present invention.

In order to better understand the operation and advantages of the present invention, it is useful to consider how optical assembly 110 is used in an autostereoscopic system having a single curved mirror 24. Referring to the single-mirror embodiment of FIG. 8, curved mirror 24 is slightly off center from both left exit pupil $P_l$ and right exit pupil $P_r$. This off-center condition causes keystone distortion in the left virtual image and an opposing keystone distortion in the right virtual image. This distortion can be corrected by electronically pre-distorting the image data provided to left image source and to the right image source 100, using image data manipulation techniques that are well known in the digital imaging art. Referring now to FIG. 4, there is shown an alternate dual-mirror embodiment that minimizes keystone distortion in the virtual images formed, since each exit pupil is on axis relative to its own curved mirror. In autostereoscopic display apparatus 10 of FIG. 4, left and right optical assemblies 110*l* and 110*r* are configured respectively as part of left and right image generation systems 170*l* and 170*r*, according to the present invention. Left and right image sources 100*l* and 100*r* form the separate left and right source images for display. In the embodiment of FIG. 4, left and right turning mirrors 112*l* and 112*r*, respectively, direct light from image source 100*l* and 100*r* to the corresponding left and right optical assemblies 110*l* and 110*r*. Left and right optical assemblies 110*l* and 110*r*, cooperating with beamsplitter 16, then form intermediate curved images 80 (as described with reference to FIG. 1, but not shown in FIG. 4) at the focal surfaces of left and right curved mirrors 24*l* and 24*r*. Left and right curved mirrors 24*l* and 24*r* then provide, again through beamsplitter 16, virtual images that can be viewed at left and right viewing pupils 14*l* and 14*r*. To the viewer at left and right viewing pupils 14*l* and 14*r*, the left and right virtual images formed with this arrangement appear to be behind left and right curved mirrors 24*l* and 24*r* respectively.

Left and right viewing pupils can range in size from 20 mm to 55 mm. When the component arrangement of FIG. 4 is used, there are also duplicate left and right viewing pupils, termed left and right outrigger pupils 15*l* and 15*r* in the present application. In practice, viewing pupils 14*l* and 14*r* that are actually used lie between duplicate left and right outrigger pupils 15*l* and 15*r* as is represented in FIG. 4. More detailed information on the left and right outrigger pupils 15*l* and 15*r* and how they are formed and impact the overall system are given subsequently.

With respect to the arrangement of FIG. 4, it must be observed that left and right turning mirrors 112*l* and 112*r* are optional, depending on the relative locations of left and right image sources 100*l* and 100*r*. In this arrangement, the image orientation presented to the viewer will be identical to that appearing on image sources 100*l* and 100*r*. Without turning mirrors 112*l* and 112*r*, a mirror image of the scene must be generated on image sources 100*l* and 100*r*. Either the single mirror arrangement of FIG. 8 or the dual mirror arrangement of FIG. 4 could be used with left and right image generation systems 170*l* and 170*r* of the present invention.

Importance of Spatial Relationships

There are a number of spatial relationships that have particular importance for obtaining optimal imaging conditions when using left and right image generation systems 170*l* and 170*r* of the present invention. As noted hereinabove with reference to FIG. 3, the coincidence of center of curvature $C_i$ of intermediate curved image 80 and pupil P is advantageous. Other key spatial relationships depend on the positioning of left and right optical assemblies 110*l* and 110*r* relative to each other. This positioning is best described with reference to the side, top, and perspective views of left and right optical assemblies 110*l* and 110*r* shown in FIGS. 5, 6, and 7 respectively.

Figure 5:
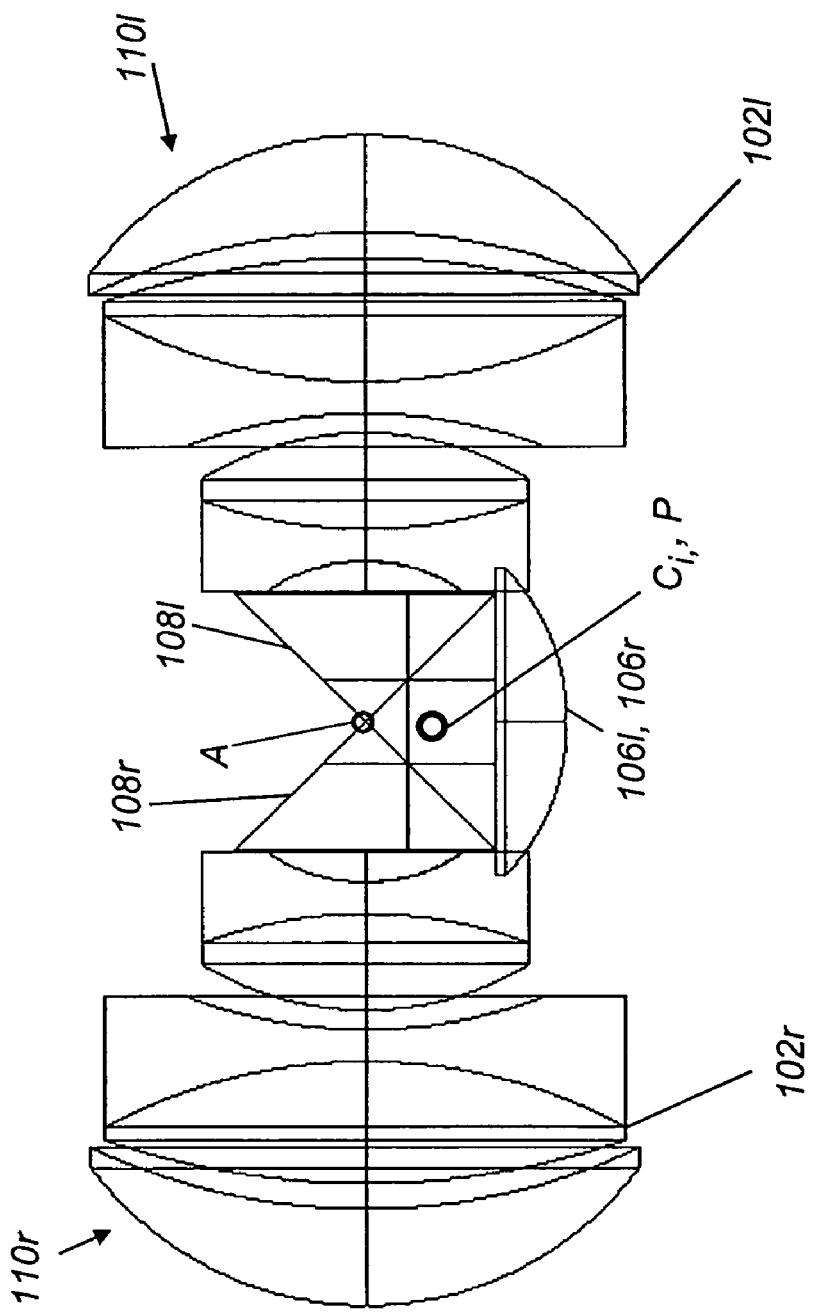
FIG. 5 is a side view showing left and right image generation systems.
Figure 6:
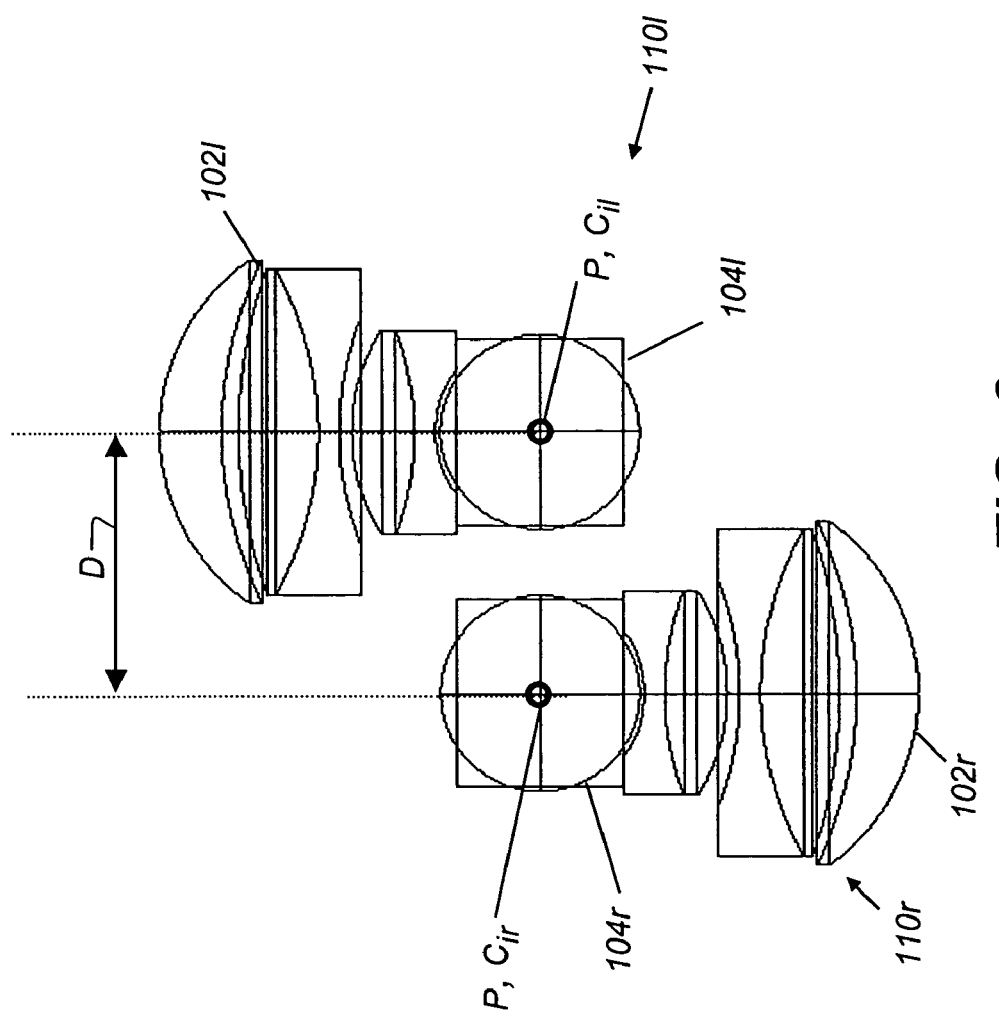
FIG. 6 is a top view showing left and right image generation systems.

In the side view of FIG. 5, center of curvature $C_i$ of intermediate curved image 80 is coincident with pupil P, which is between aperture stop A on left and right reflective surfaces 108*l* and 108*r* and lenses 106*l* and 106*r*. FIG. 6 shows the position of left and right centers of curvature $C_{il}$ and $C_{ir}$ and their coincident pupils $P_l$ and $P_r$ from a top view. For the single curved mirror 24 embodiment of FIG. 8, the center of curvature $C_i$ of curved mirror 24 ideally lies midway between left and right pupils $P_l$ and $P_r$. For the dual curved mirror 24*l*, 24*r* embodiment of FIG. 4, each center of curvature $C_{il}$ and $C_{ir}$ is ideally coincident with the corresponding center of curvature of curved mirror 24*l*, 24*r*.

Figure 7:
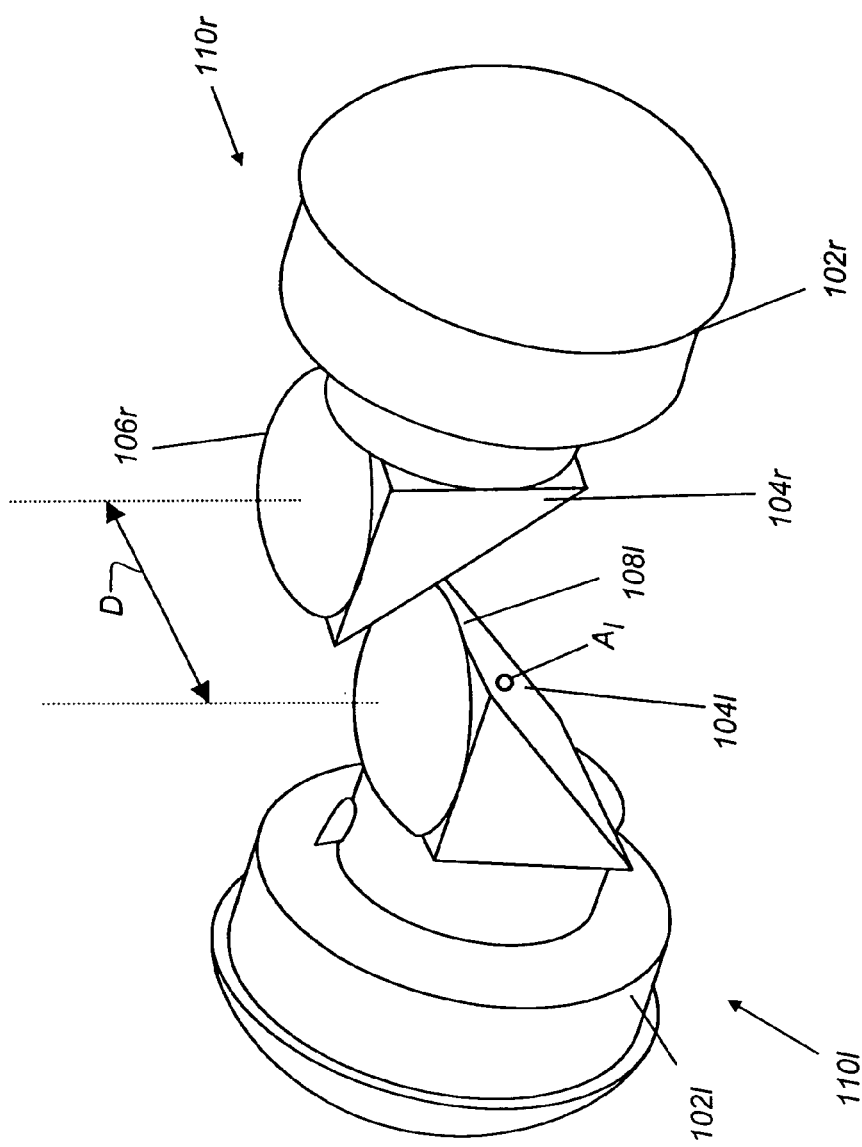
FIG. 7 is a perspective view showing left and right image generation systems.

Another key spatial relationship relates to the interocular distance of viewer 12 (FIG. 1). As is shown in FIGS. 6 and 7, the arrangement of left and right optical assemblies 110*l* and 110*r* enables them to be positioned closely together within autostereoscopic display apparatus 10, separated by a distance D. For 1:1 imaging, distance D can be set to closely approximate the interocular distance of viewer 12, which is typically in the range of 5–8 cm. An adaptive arrangement would even allow dynamic adjustment of separation distance D to suit an individual viewer 12.

It must be emphasized that the arrangement shown in FIGS. 4–8 achieves compactness by folding the imaging path at aperture stop A. At this point, the imaging beam is at a minimum width. With the optical path folded at this point, the apparatus used to form left and right source images can be any suitable projection device and can have output lenses with diameters in the 65–200 mm range.

In summary, where a single curved mirror 24 is used with left and right image generation systems 170*l* and 170*r* of the present invention, a central point midway between left and right pupils $P_l$ and $P_r$ or left and right image centers of curvature $C_{il}$ and $C_{ir}$ corresponds to the center of curvature of curved mirror 24. Where paired left and right curved mirrors 24*l* and 24*r* are used, left and right centers of curvature $C_{il}$ and $C_{ir}$ each correspond to the appropriate center of curvature of the corresponding left or right curved mirror 24*l* or 24*r*. The curved intermediate images formed have centers of curvature coincident with left and right centers of curvature $C_{il}$ and $C_{ir}$.

Optimal imaging performance is obtained when the spatial relationships described hereinabove are obtained. However, in practice, some tolerance would be allowable. For example, with reference to FIGS. 1, 3, and 4, intermediate curved image 80 need not be precisely spherical in curvature to provide reasonable image quality. Similarly, curved mirrors 24, 24*l*, and 24*r* may vary somewhat from spherical curvature, yet provide adequate imaging performance. Excessive variation from spherical curvature, however, will result in unsatisfactory imaging and can even prevent the formation of virtual images that would be visible at viewing pupils 14*l* and 14*r*.

Types of Image Source

Using the overall arrangement of FIGS. 3 and 4, image source 100 can be any of a number of image sources that emit modulated light, such as a projector, a display LCD, a CRT, an LED matrix, or an OLED or PLED device, for example. Two characteristics of image source 100 are particularly significant with this arrangement:

(i) The image formed on image source 100 is substantially flat. There may be some slight curvature to this image, such as would be provided by a CRT; however, the arrangement of FIGS. 3 and 4 work well when image source 100 is flat and shows how intermediate image 80 is formed having a curvature using the methods of the present invention. Since most image display devices form a flat image, there is, then, no need for modification to off-the-shelf display components with this arrangement.

(ii) Image source 100 can be several inches in diameter, and may be well over one foot in diameter. In a preferred embodiment, image source 100 is a large LCD display, such as a 17-inch display, for example. This is unlike other apparatus for forming a curved intermediate image, such as was shown with reference to FIG. 2, for which a microdisplay, such as a liquid crystal on silicon (LCOS) or DMD component, is used. Use of a larger display device for image source 100 has particular advantages for increasing both image resolution and brightness.

As described with reference to the Lagrange invariant in the background section above, brightness in an optical system is a product of the emissive area and the solid angle into which light is emitted. By allowing image source 100 to have a large emissive area, the method of the present invention allows substantial brightness levels while, at the same time, allowing light angles to be relatively small. Small light angles are advantageous for maximizing image contrast and minimizing color shifting and other related image aberrations.

As shown in FIG. 4, separate image sources 100*l* and 100*r* are used for left and right eyes, respectively. Ideally, image source 100*l* for left image generation system 170*l* and image source 100*r* for right image generation system 170*r* are well-matched for image size and color. CRT displays, however, may be at a disadvantage if used as image sources 100. Color differences between CRTs may degrade stereoscopic imaging performance. Additionally, as a result of display ageing, CRT image areas may vary dimensionally, effectively causing left/right pixel misalignment. In contrast to CRT displays, LCD displays offer improved dimensional stability with stable pixel locations, ease of alignment, and simpler mounting.

Formation of and Effects of Left and Right Outrigger Pupils 15*l* and 15*r*

As shown in FIG. 4, left and right outrigger pupils 15*l* and 15*r* are formed as duplicates of left and right viewing pupil 14*l* and 14*r* as a result of off-axis imaging effects. Light from left optical assembly 110*l*, for example, is on-axis for left curved mirror 24*l* and forms left viewing pupil 14*l* at the appropriate position. However, a portion of the light from left optical assembly 110*l* is also directed, through beamsplitter 16, toward right curved mirror 24r. This light, however, is off-axis with respect to right curved mirror 24r, forming left outrigger pupil 15l, to the right of right viewing pupil 14r in the view of FIG. 4. Left outrigger pupil 15l is thus identical in image content to left viewing pupil 14l, but is positioned incorrectly for stereoscopic viewing. In similar fashion, right outrigger pupil 15r, formed by the cooperation of left curved mirror 24l and beamsplitter 16, has the image content intended for the right eye and is placed to the left of left viewing pupil 14l.

Figure 9:
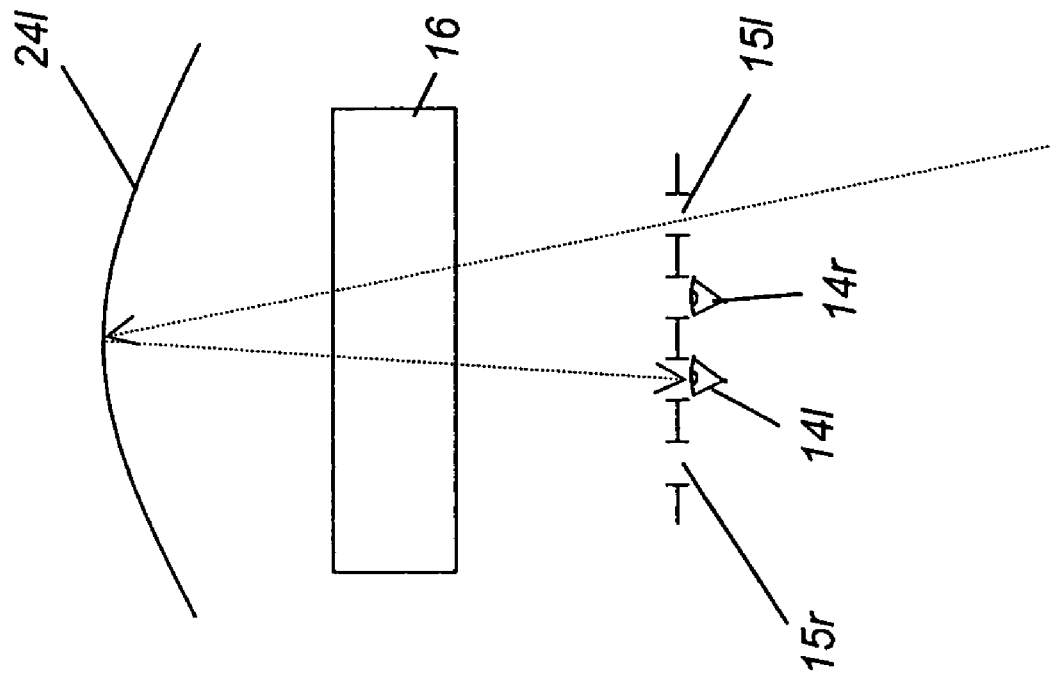
FIG. 9 is a top view showing the overall spatial relationship of viewing pupils and outrigger pupils to beamsplitter and curved mirror components.

Imaging light is directed to left and right outrigger pupils 15l and 15r without any noteworthy effect on system performance. That is, the viewer is positioned to observe the autostereoscopic image at viewing left and right viewing pupils 14l and 14r, rather than through left and right outrigger pupils 15l and 15r. However, outrigger pupils 15l and 15r can have a detrimental effect on image quality due to background imaging. Stray light from behind the viewer can enter the optical system of autostereoscopic display apparatus 10 through left and right outrigger pupils 15l and 15r. When this happens, background images can be caused by the light reflected from one or both curved mirrors 24l, 24r. Referring to FIG. 9, there is shown, from a top view, the arrangement of left and right viewing pupils 14l and 14r and their corresponding left and right outrigger pupils 15l and 15r. Light from behind the viewer is shown entering left outrigger pupil 15l, which is positioned to the right of right viewing pupil 14r as shown. This light is then reflected by right curved mirror 24l into left viewing pupil 14l. Similarly, stray light that enters right outrigger pupil 15r would be reflected by left curved mirror 24r into right viewing pupil 14r.

Correction to Compensate for Stray Light

Figure 10:
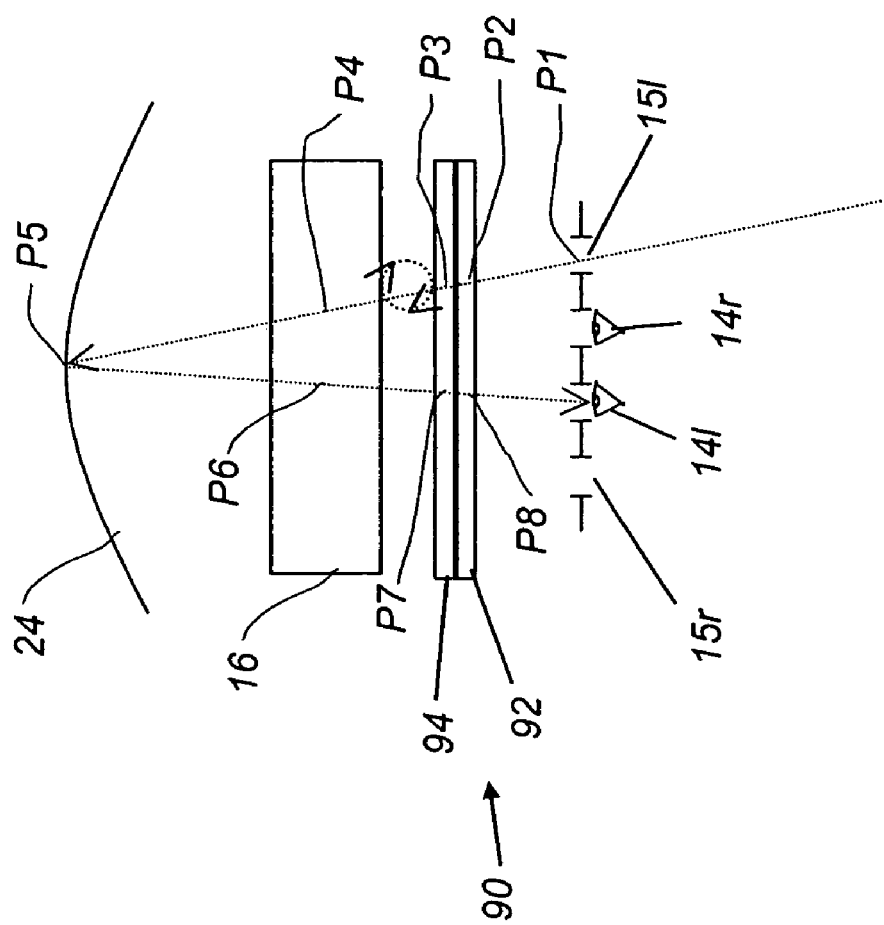
FIG. 10 is a top view showing the overall spatial relationship of viewing pupils and outrigger pupils to beamsplitter and curved mirror components, with the addition of a circular polarizer in an embodiment of the present invention.

Referring to FIG. 10, there is shown, in a top view, the arrangement of components for correcting the ghosting condition described above with respect to FIGS. 4 and 9. In FIG. 10, a circular polarizer 90, consisting of a linear polarizer 92 combined with a quarter waveplate 94, is disposed between the position of viewing pupils 14l and 14r and beamsplitter 16. Using this arrangement, stray light entering autostereoscopic display apparatus 10 from left or right outrigger pixel 15l or 15r is circularly polarixed upon entry. Reflected light from curved mirror 24, also circularly polarized, is blocked from exiting. In this way, background glare effects are eliminated.

In order to understand how circular polarizer 90 performs this function, it is useful to observe how the components in the stray light path of FIG. 10 handle light polarization state. Annotation in FIG. 10 shows the behavior of light at significant points, as follows:

(i) At a point P1, unpolarized stray light enters autostereoscopic display apparatus 10 through left outrigger pupil 15l;

(ii) At a point P2, linear polarizer 92 transmits linearly polarized light;

(iii) At a point P3, linearly polarized light that is transmitted through quarter waveplate 94 becomes circularly polarized light;

(iv) At a point P4, a portion of the circularly polarized light is transmitted through (or reflected by) beamsplitter 16;

(v) At a point P5, the portion of the circularly polarized light is reflected from curved mirror 24;

(vi) At a point P6, the reflected light is again transmitted through (or reflected by) beamsplitter 16;

(vii) At a point P7, quarter waveplate 94 transmits, from incident circularly polarized light, linearly polarized light, substantially orthogonal to the linearly polarized light at point P2; and (viii) At a point P8, the linearly polarized light, since substantially orthogonal to the transmission axis of linear polarizer 92, is absorbed (or reflected), rather than being transmitted through linear polarizer 92.

Thus, following steps (i)–(viii) above, it can be seen that the use of circular polarizer 90 effectively eliminates any background glare effect due to stray light incident at left or right outrigger pupils 15l and 15r.

Figure 12:
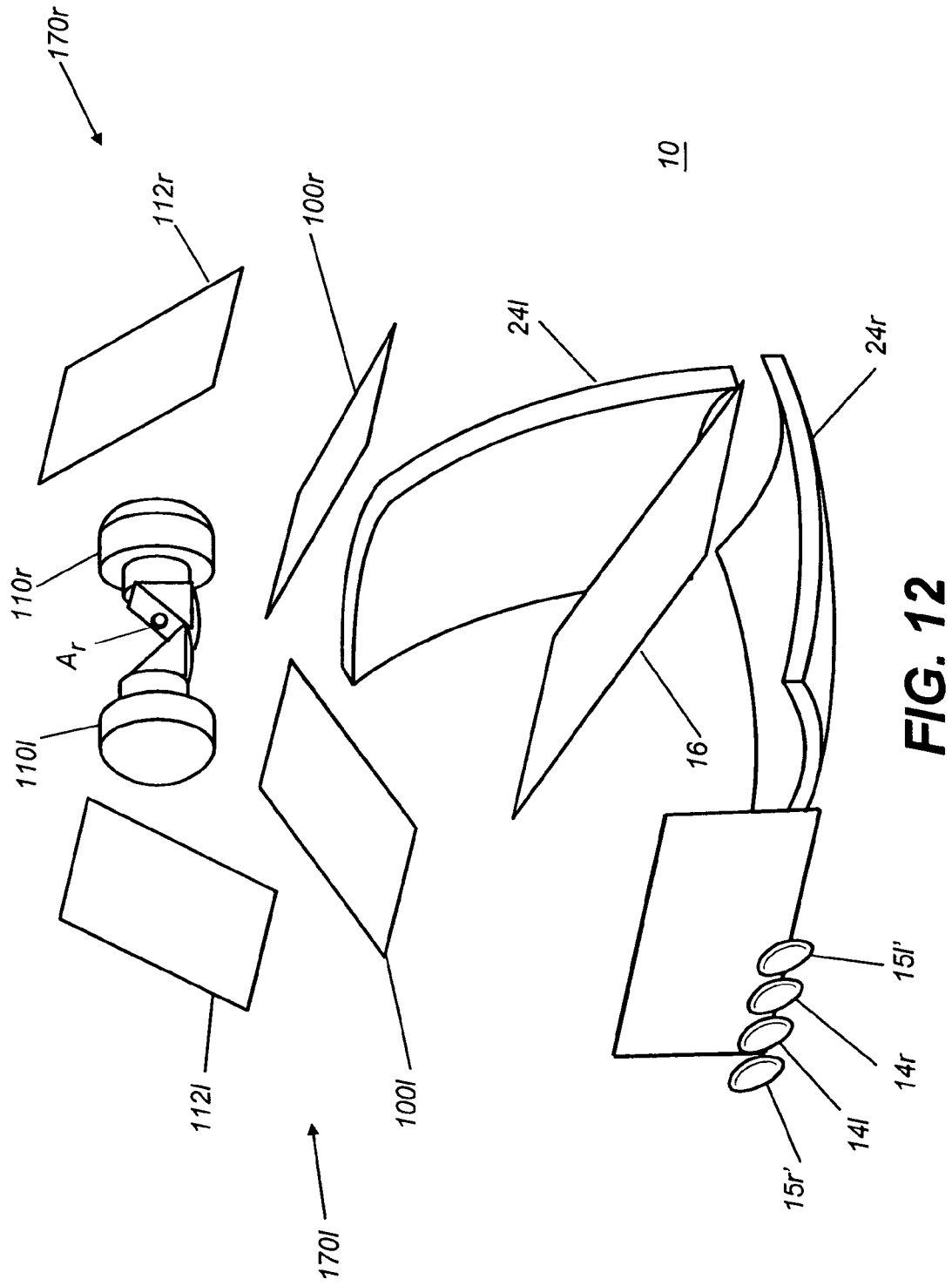
FIG. 12 is a perspective view showing the basic components and optical behavior of an image generation system in a single-mirror embodiment, with an added circular polarizer, according to the present invention.

Those skilled in the optical arts can appreciate that circular polarizer 90 can be embodied in a number of ways for use in autostereoscopic display apparatus 10. For example, circular polarizer 90 could be provided as a single component, as a type of cover plate for autostereoscopic display apparatus 10, as is shown in FIG. 12. Optionally, circular polarizer 90 could be embodied by separately positioning linear polarizer 92 and its corresponding quarter waveplate 94 at different points in the optical path.

Figure 11:
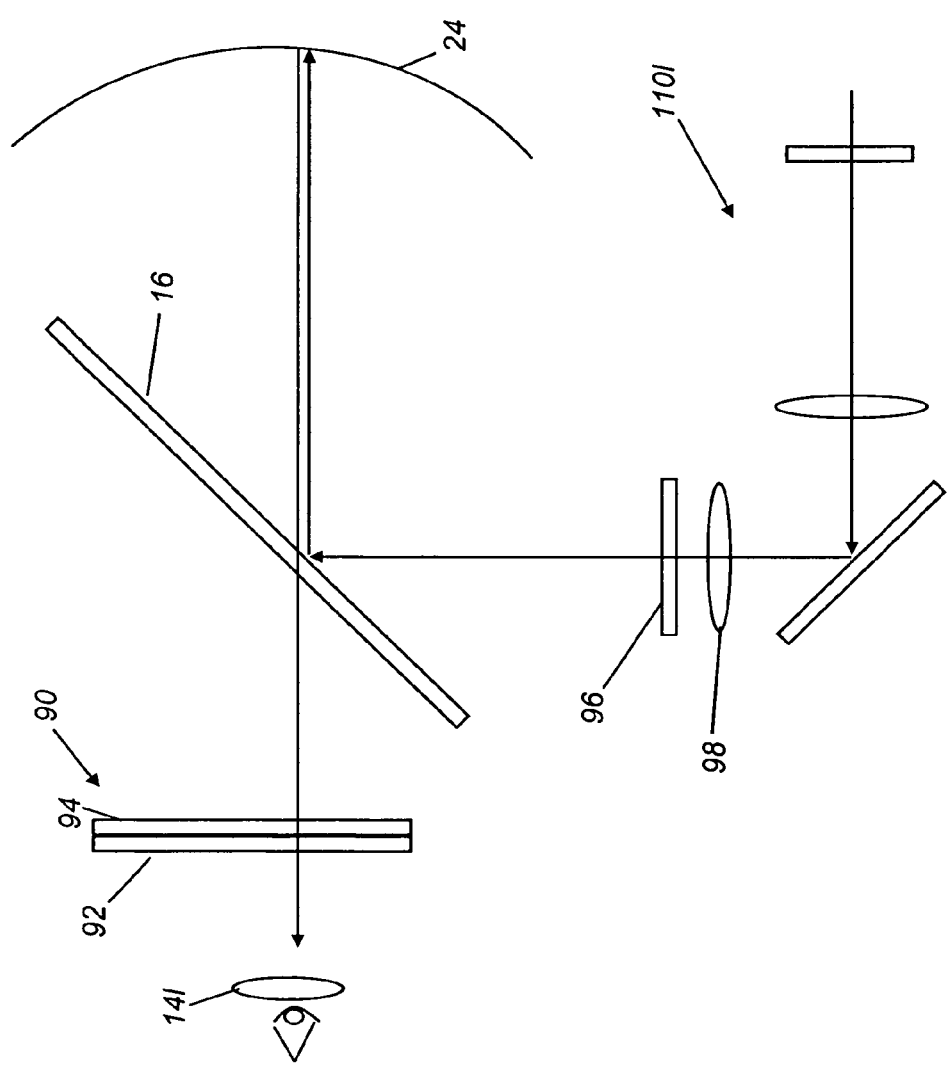
FIG. 11 is a side view showing the relationship of the circular polarizer of the present invention to a single left or right imaging channel.

Referring to FIG. 11, there is shown an alternate embodiment in which an additional quarter waveplate 96 is deployed to support either or both left and right optical assemblies 110l and 110r. In FIG. 11, lens 98 collects linerarly polarized output light from left optical assembly 110l and directs the light through quarter waveplate 96, which provides circularly polarized light output. This output light, reflected towards curved mirror 24 by beamsplitter 16 and reflected through beamsplitter 16 by curved mirror 24 is changed to linearly polarized light by quarter waveplate 94. Linear polarizer 92 then transmits this linearly polarized light. This arrangement of polarizers may be useful, for example, for obtaining improved brightness from autostereoscopic display apparatus 10.

Because of the pupil imaging design of autostereoscopic display apparatus 10, the deployment of circular polarizer 90 is most useful for embodiments using the dual curved mirror 24l, 24r configuration of FIG. 12. With this arrangement, autostereoscopic display apparatus 10 can be vulnerable to background glare and stray light effects. However, there may also be advantages in using circular polarizer 90 with a configuration using a single curved mirror 24. The effect of stray light reflection from jewelry, eyeglasses, or other specular surfaces near left and right viewing pupils 14l and 14r can also be corrected using circular polarizer 90 disposed between beamsplitter 16 and left and right viewing pupils 14l and 14r.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, in order to take advantage of the benefits of monocentric imaging, curved mirror 24 or pair of curved mirrors 24l, 24r will be substantially spherical in most embodiments; however, some slight shape modifications might be used, with the corresponding changes to supporting optics. Curved mirror 24 or 24l, 24r could be fabricated as a highly reflective surface using a number of different materials. A number of different possible arrangements could be used for implementing circular polarizer 90.

Thus, what is provided is an apparatus and method for autostereoscopic image display having reduced ghosting from stray light effects.

PARTS LIST

- 10 autostereoscopic display apparatus
- 12 viewer
- 14 viewing pupil
- 14*l* left viewing pupil
- 14*r* right viewing pupil
- 15*l* left outrigger pupil
- 15*r* right outrigger pupil
- 16 beamsplitter
- 22 front focal surface
- 24 curved mirror
- 24*l* curved mirror, left
- 24*r* curved mirror, right
- 30 ball lens assembly
- 30*l* ball lens assembly, left
- 30*r* ball lens assembly, right
- 32 diffusing element
- 40 diffusive surface
- 54 relay lens
- 70 image generation system
- 70*l* left image generation system
- 70*r* right image generation system
- 74 image generator
- 76 curved intermediate image
- 80 intermediate curved image
- 82 stereoscopic projection system
- 90 circular polarizer
- 92 linear polarizer
- 94 quarter waveplate
- 96 quarter waveplate
- 98 Lens
- 100 image source
- 100*l* left image source
- 100*r* right image source
- 102 entrance optics
- 102*l* left entrance optics
- 102*r* right entrance optics
- 104 turning prism
- 104*l* left turning prism
- 104*r* right turning prism
- 106 output lens
- 106*l* left output lens
- 106*r* right output lens
- 108 reflective surface
- 108*l* left reflective surface
- 108*r* right reflective surface
- 110 optical assembly
- 110*l* left optical assembly
- 110*r* right optical assembly
- 112*l* left turning mirror
- 112*r* right turning mirror
- 170 image generation system
- 170*l* left image generation system
- 170*r* right image generation system

The invention claimed is:

1. An autostereoscopic optical apparatus for viewing a stereoscopic image comprising a left image to be viewed by an observer at a left viewing pupil and a right image to be viewed by the observer at a right viewing pupil, the apparatus comprising:

(a) a left image generation system for forming a left curved intermediate image near a focal surface of a curved mirror, the left image generation system comprising:

(i) a left image source for forming a left source image; and (ii) a left optical system comprising at least one lens for collecting light from the left image source and a left image folding surface for directing the collected light to form the left curved intermediate image, wherein the left optical system forms an exit pupil optically centered near a center of curvature of the left curved intermediate image;

(b) a right image generation system for forming a right curved intermediate image near the focal surface of the curved mirror, the right image generation system comprising:

(i) a right image source for forming a right source image; and (ii) a right optical system comprising at least one lens for collecting light from the right image source and a right image folding surface for directing the collected light to form the right curved intermediate image, wherein the right optical system forms an exit pupil optically centered near a center of curvature of the right curved intermediate image;

(c) a center of curvature of the curved mirror placed substantially optically midway between the exit pupil of the left optical system and exit pupil of the right optical system;

(d) a beamsplitter disposed between the focal surface and the center of curvature of the curved mirror, the curved mirror and beamsplitter cooperating to form, at the left viewing pupil:

(i) a real image of the exit pupil of the left optical system; and (ii) an image of the left curved intermediate image that appears to be behind the curved mirror;

the curved mirror and beamsplitter further cooperating to form, at the right viewing pupil:

(i) a real image of the exit pupil of the right optical system; and (ii) an image of the right curved intermediate image that appears to be behind the curved mirror; and (e) a circular polarizer disposed between the beamsplitter and the left and right viewing pupils for conditioning the polarization of incident and output light.

2. An autostereoscopic optical apparatus according to claim 1 further comprising a prism optically coupled with the left image folding surface.

3. An autostereoscopic optical apparatus according to claim 1 wherein the left image folding surface is disposed substantially at an aperture stop of the left optical system.

4. An autostereoscopic optical apparatus according to claim 1 wherein an aperture stop and exit pupil of the left optical system are farther than 4 mm apart.

5. An autostereoscopic optical apparatus according to claim 1 wherein a diameter of the output lens of the left image source is in the range of 65–200 mm.

6. An autostereoscopic optical apparatus according to claim 1 wherein the left image folding surface is a mirror.

7. An autostereoscopic optical apparatus according to claim 1 wherein at least one of the left and right source images is pre-distorted to correct optical distortion.

8. An autostereoscopic optical apparatus according to claim 1 wherein the left optical system further comprises a quarter-wave plate.

9. An auto stereoscopic optical apparatus for viewing a stereoscopic image comprising a left virtual image to be viewed by an observer at a left viewing pupil and a right virtual image to be viewed by the observer at a right viewing pupil, the apparatus comprising:

(a) a left image generation system for forming a left curved intermediate image near the focal surface of a curved mirror, the left image generation system comprising:
  (i) a left image source for forming a left source image; and
  (ii) a left optical system comprising at least one lens for collecting light from the left image source and a left image folding surface for directing the collected light to form the left curved intermediate image, wherein the left optical system forms an exit pupil optically centered near the center of curvature of the left curved intermediate image;
(b) a right image generation system for forming a right curved intermediate image near the focal surface of the curved mirror, the right image generation system comprising:
  (i) a right image source for forming a right source image; and
  (ii) a right optical system comprising at least one lens for collecting light from the right image source and a right image folding surface for directing the collected light to form the right curved intermediate image, wherein the right optical system forms an exit pupil optically centered near the center of curvature of the right curved intermediate image;
(c) the center of curvature of the curved mirror placed substantially optically midway between the exit pupil of the left optical system and exit pupil of the right optical system;
(d) a beamsplitter disposed between the focal surface and the center of curvature of the curved mirror, the curved mirror and beamsplitter cooperating to form, at the left viewing pupil:
  (i) a real image of the exit pupil of the left optical system; and
  (ii) a virtual image of the left curved intermediate image;
the curved mirror and beamsplitter further cooperating to form, at the right viewing pupil:
  (i) a real image of the exit pupil of the right optical system; and
  (ii) a virtual image of the right curved intermediate image; and
(e) a circular polarizer disposed between the beamsplitter and the left and right viewing pupils for conditioning the polarization of incident and output light.

10. An autostereoscopic optical apparatus according to claim 9 wherein the left optical system further comprises a quarter-wave plate.

11. An auto stereoscopic optical apparatus for viewing a stereoscopic virtual image comprising a left image to be viewed by an observer at a left viewing pupil and a right image to be viewed by the observer at a right viewing pupil, the apparatus comprising:
(a) a left image generation system and a right image generation system, each image generation system comprising:
  (i) an image source for forming a source image; and
  (ii) an optical system comprising at least one lens for collecting light from the image source and an image folding surface for directing the collected light to form a curved intermediate image, wherein the optical system forms an exit pupil optically centered near the center of curvature of the curved intermediate image;
(b) a beamsplitter disposed to form the curved intermediate image of the left image generation system near the focal surface of a left curved mirror and to form the curved intermediate image of the right image generation system near the focal surface of a right curved mirror; wherein the left curved mirror has a center of curvature substantially coincident with the exit pupil of the left optical system for the left image generation system;
wherein the right curved mirror has a center of curvature substantially coincident with the exit pupil of the right optical system for the right image generation system;
wherein the beamsplitter cooperates with the left curved mirror to form, at the left viewing pupil, a real image of the exit pupil of the left optical system for the left image generation system and an image of the curved intermediate image formed by the left image generation system that appears to be behind the left curved mirror;
wherein the beamsplitter cooperates with the right curved mirror to form, at the right viewing pupil, a real image of the pupil of the optical system for the right image generation system and an image of the curved intermediate image formed by the right image generation system that appears to be behind the right curved mirror; and
(c) a circular polarizer disposed between the beamsplitter and the left and right viewing pupils for conditioning the polarization of incident and output light.

12. An autostereoscopic optical apparatus according to claim 11 further comprising a prism optically coupled with the image folding surface of the image generation system.

13. An autostereoscopic optical apparatus according to claim 11 wherein the image folding surface is disposed substantially at the aperture stop of the optical system.

14. An autostereoscopic optical apparatus according to claim 11 wherein the aperture stop and exit pupil of the optical system are farther than 4 mm apart.

15. An autostereoscopic optical apparatus according to claim 11 wherein the diameter of the output lens of the image source is in the range of 65–200 mm.

16. An autostereoscopic optical apparatus according to claim 11 wherein the image folding surface is a mirror.

17. An autostereoscopic optical apparatus according to claim 11 wherein the source image is pre-distorted to correct optical distortion.

18. An autostereoscopic optical apparatus according to claim 11 wherein the optical system for the left image generation system further comprises a quarter-wave plate.

19. An autostereoscopic optical apparatus for viewing a stereoscopic virtual image comprising a left virtual image to be viewed by an observer at a left viewing pupil and a right virtual image to be viewed by the observer at a right viewing pupil, the apparatus comprising:
(a) a left image generation system and a right image generation system, each image generation system comprising:
  (i) an image source for forming a source image; and
  (ii) an optical system comprising at least one lens for collecting light from the image source and an image folding surface for directing the collected light to form a curved intermediate image, wherein the optical system forms an exit pupil optically centered near the center of curvature of the curved intermediate image;
(b) a beamsplitter disposed to form the curved intermediate image of the left image generation system near the focal surface of a left curved mirror and to form the curved intermediate image of the right image generation system near the focal surface of a right curved mirror;

wherein the left curved mirror has a center of curvature substantially coincident with the exit pupil of the left optical system for the left image generation system;

wherein the right curved mirror has a center of curvature substantially coincident with the exit pupil of the right optical system for the right image generation system;

wherein the beamsplitter cooperates with the left curved mirror to form, at the left viewing pupil, a real image of the exit pupil of the left optical system for the left image generation system and a virtual image of the curved intermediate image formed by the left image generation system;

wherein the beamsplitter cooperates with the right curved mirror to form, at the right viewing pupil, a real image of the pupil of the optical system for the, right image generation system and a virtual image of the curved intermediate image formed by the right image generation system; and (c) a circular polarizer disposed between the beamsplitter and the left and right viewing pupils for conditioning the polarization of incident and output light.

20. An autostereoscopic optical apparatus according to claim 19 wherein the optical system for the left image generation system further comprises a quarter-wave plate.

21. A method for forming an autostereoscopic image comprising a left image to be viewed by an observer at a left viewing pupil and a right image to be viewed by the observer at a right viewing pupil, the method comprising:
 (a) forming a left curved intermediate image near the focal surface of a curved mirror by:
  (i) forming a left source image from a left image source; and
  (ii) collecting light from the left image source and folding the light path at a reflective surface to form the left curved intermediate image, whereby the exit pupil is optically centered near the center of curvature of the left curved intermediate image;
 (b) forming a right curved intermediate image near the focal surface of the curved mirror by:
  (i) forming a right source image from a right image source; and
  (ii) collecting light from the right image source and folding the light path at a reflective surface to form the right curved intermediate image, whereby the exit pupil is optically centered near the center of curvature of the right curved intermediate image;
 wherein the center of curvature of the curved mirror is substantially optically midway between the exit pupil of the left and right optical paths;
 (c) disposing a beamsplitter between the focal surface and the center of curvature of the curved mirror, the curved mirror and beamsplitter cooperating to form, at the left viewing pupil:
  (i) a real image of the pupil of the left prism; and
  (ii) an image of the left curved intermediate image that appears to be behind the curved mirror;
 the curved mirror and beamsplitter further cooperating to form, at the right viewing pupil:
  (i) a real image of the pupil of the right prism; and
  (ii) an image of the right curved intermediate image that appears to be behind the curved mirror; and
 (d) disposing a circular polarizer between the beamsplitter and the left and right viewing pupils for conditioning the polarization of incident and output light.

22. A method for forming an autostereoscopic image according to claim 21 wherein the step of forming a left source image comprises the step of modulating an LCD.

23. A method for forming an autostereoscopic virtual image comprising a left image to be viewed by an observer at a left viewing pupil and a right image to be viewed by the observer at a right viewing pupil, the method comprising:
 (a) forming a left curved intermediate image near the focal surface of a curved mirror by:
  (i) forming a left source image from a left image source; and
  (ii) collecting light from the left image source and folding the light path at a reflective surface to form the left curved intermediate image, whereby the exit pupil is optically centered near the center of curvature of the left curved intermediate image;
 (b) forming a right curved intermediate image near the focal surface of the curved mirror by:
  (i) forming a right source image from a right image source; and
  (ii) collecting light from the right image source and folding the light path at a reflective surface to form the right curved intermediate image, whereby the exit pupil is optically centered near the center of curvature of the right curved intermediate image;
 wherein the center of curvature of the curved mirror is substantially optically midway between the exit pupil of the left and right optical paths;
 (c) disposing a beamsplitter between the focal surface and the center of curvature of the curved mirror, the curved mirror and beamsplitter cooperating to form, at the left viewing pupil:
  (i) a real image of the pupil of the left prism; and
  (ii) a virtual image of the left curved intermediate image;
 the curved mirror and beamsplitter further cooperating to form, at the right viewing pupil:
  (i) a real image of the pupil of the right prism; and
  (ii) a virtual image of the right curved intermediate image; and
 (d) disposing a circular polarizer between the beamsplitter and the left and right viewing pupils for conditioning the polarization of incident and output light.

24. A method for forming an autostereoscopic image comprising a left image to be viewed by an observer at a left viewing pupil and a right image to be viewed by the observer at a right viewing pupil, the method comprising:
 (a) forming a left curved intermediate image near the focal surface of a left curved mirror by:
  (i) forming a left source image; and
  (ii) collecting light from the left source image and folding the light path at a reflective surface to form the left curved intermediate image, wherein the exit pupil is optically centered near the center of curvature of the left curved intermediate image, wherein the center of curvature of the left curved mirror is substantially coincident with the exit pupil;
 (b) forming a right curved intermediate image near the focal surface of a right curved mirror by:
  (i) forming a right source image; and
  (ii) collecting light from the right source image and folding the light path at a reflective surface to form the right curved intermediate image, wherein the exit pupil is optically centered near the center of curvature of the right curved intermediate image, wherein the center of curvature of the right curved mirror is substantially coincident with the exit pupil;

(c) disposing a beamsplitter to form, at the left viewing pupil, a real image of the pupil of the optical system for the left image generation system; and to form, at the right viewing pupil, a real image of the pupil of the optical system for the right image generation system; and (d) disposing a circular polarizer between the beamsplitter and the left and right viewing pupils for conditioning the polarization of incident and output light.

25. A method for forming an autostereoscopic virtual image comprising a left image to be viewed by an observer at a left viewing pupil and a right image to be viewed by the observer at a right viewing pupil, the method comprising:

(a) forming a left curved intermediate image near the focal surface of a left curved mirror by:
   (i) forming a left source image; and
   (ii) collecting light from the left source image and folding the light path at a reflective surface to form the left curved intermediate image, wherein the exit pupil is optically centered near the center of curvature of the left curved intermediate image, wherein the center of curvature of the left curved mirror is substantially coincident with the exit pupil;

(b) forming a right curved intermediate image near the focal surface of a right curved mirror by:
   (i) forming a right source image; and
   (ii) collecting light from the right source image and folding the light path at a reflective surface to form the right curved intermediate image, wherein the exit pupil is optically centered near the center of curvature of the right curved intermediate image, wherein the center of curvature of the right curved mirror is substantially coincident with the exit pupil;

(c) disposing a beamsplitter to form, at the left viewing pupil, a real image of the pupil of the optical system for the left image generation system; and to form, at the right viewing pupil, a real image of the pupil of the optical system for the right image generation system; and (d) disposing a circular polarizer between the beamsplitter and the left and right viewing pupils for conditioning the polarization of incident and output light.

* * * * *